United States Patent
Yamasaki et al.

(10) Patent No.: US 10,207,281 B2
(45) Date of Patent: Feb. 19, 2019

(54) ELECTROSTATIC PAINTING METHOD AND ELECTROSTATIC PAINTING APPARATUS

(71) Applicant: TOYOTA JIDOSHA KABUSHIKI KAISHA, Toyota-shi (JP)

(72) Inventors: Isamu Yamasaki, Toyota (JP); Kengo Honma, Tokai (JP); Nobuo Kodaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 208 days.

(21) Appl. No.: 14/913,186

(22) PCT Filed: Aug. 19, 2014

(86) PCT No.: PCT/IB2014/001668
§ 371 (c)(1),
(2) Date: Feb. 19, 2016

(87) PCT Pub. No.: WO2015/025215
PCT Pub. Date: Feb. 26, 2015

(65) Prior Publication Data
US 2016/0207054 A1    Jul. 21, 2016

(30) Foreign Application Priority Data
Aug. 21, 2013  (JP) ................. 2013-170954

(51) Int. Cl.
| B05B 5/16 | (2006.01) |
| B05B 5/035 | (2006.01) |
| B05D 1/04 | (2006.01) |
| G01F 23/24 | (2006.01) |

(52) U.S. Cl.
CPC ............ *B05B 5/1608* (2013.01); *B05B 5/035* (2013.01); *B05D 1/04* (2013.01); *G01F 23/24* (2013.01)

(58) Field of Classification Search
CPC .......... B05B 1/04; B05B 5/035; B05B 5/1608
See application file for complete search history.

(56) References Cited

U.S. PATENT DOCUMENTS

2010/0245464 A1*  9/2010  Maida .................. B41J 2/16552
                                                                  347/28
2010/0307413 A1* 12/2010  Mitsui .................. B05B 5/1625
                                                                  118/627

FOREIGN PATENT DOCUMENTS

| JP | 10-114393 A | 5/1998 |
| JP | 2001-137846 A | 5/2001 |

(Continued)

OTHER PUBLICATIONS

International Search Report dated Nov. 18, 2014 in PCT/IB14/01668 Filed Aug. 19, 2014.

*Primary Examiner* — Xiao S Zhao
(74) *Attorney, Agent, or Firm* — Oblon, McClelland, Maier & Neustadt, L.L.P.

(57) ABSTRACT

An electrostatic painting method includes supplying, via a pure water supply passage, pure water to a paint tank within which paint is stored, applying a voltage to paint that is pushed out from the paint tank by the supplied pure water, and spraying the paint to which the voltage has been applied, at an object to be painted. Pure water remaining in the pure water supply passage is replaced to increase an electrical resistance value of the pure water before starting to paint the object to be painted.

10 Claims, 6 Drawing Sheets

(56) References Cited

FOREIGN PATENT DOCUMENTS

| | | | |
|---|---|---|---|
| JP | 2001-355087 | A | 12/2001 |
| JP | 2006-346596 | A | 12/2006 |

* cited by examiner

ELECTROSTATIC PAINTING METHOD AND ELECTROSTATIC PAINTING APPARATUS

BACKGROUND OF THE INVENTION

1. Field of the Invention

The invention relates to an electrostatic painting method and an electrostatic painting apparatus that apply high voltage to paint and paints an object to be painted.

2. Description of Related Art

Typically, when painting a vehicle or the like, high voltage is applied to paint, and an object to be painted is painted. For example, Japanese Patent Application Publication No. 2006-346596 (JP 2006-346596 A) describes an electrostatic painting apparatus that pushes out paint from a paint tank by supplying pure water to the paint tank, applies high voltage to the paint, and sprays the paint.

SUMMARY OF THE INVENTION

However, with the electrostatic painting apparatus described in JP 2006-346596 A, while the apparatus is stopped, pure water may remain in a pure water supply passage that supplies pure water to the paint tank, and the electrical resistance value of this pure water may decrease. If painting starts and high voltage is applied in this state, the current value flowing to the pure water remaining in the pure water supply passage will become large and a high voltage abnormality may result, such that painting may not be able to be performed normally. The invention thus provides an electrostatic painting method and an electrostatic painting apparatus capable of performing painting normally by inhibiting a high voltage abnormality when painting starts.

A first aspect of the invention relates to an electrostatic painting method that includes supplying, via a pure water supply passage, pure water to a paint tank within which paint is stored; applying a voltage to paint that is pushed out from the paint tank by the supplied pure water; and spraying the paint to which the voltage has been applied, at an object to be painted. Pure water remaining in the pure water supply passage is replaced to increase an electrical resistance value of the pure water before starting to paint the object to be painted.

In this first aspect, the pure water remaining in the pure water supply passage may be circulated to a pure water supply device that supplies the pure water, or the pure water remaining in the pure water supply passage may be discharged outside, before starting to paint the object to be painted.

The electrostatic painting method may also include detecting the electrical resistance value of the pure water in the pure water supply passage. When the detected electrical resistance value of the pure water in the pure water supply passage becomes a predetermined value, circulation of the pure water remaining in the pure water supply passage to the pure water supply device, or discharge of the pure water remaining in the pure water supply passage, may be stopped.

The electrostatic painting method may also include detecting a leakage current value that leaks from the pure water in the pure water supply passage. When the detected leakage current value of the pure water in the pure water supply passage becomes a predetermined value, circulation of the pure water remaining in the pure water supply passage to the pure water supply device, or discharge of the pure water remaining in the pure water supply passage, may be stopped.

In the electrostatic painting method, the paint tank may be detachably provided on a painting machine that paints the object to be painted. Also, pure water remaining in the pure water supply passage positioned between a mounting portion of the painting machine, which is a ground region, and the paint tank that is a high voltage region, may be replaced before starting to paint the object to be painted.

The electrostatic painting method may also include injecting pure water into a tank within which water is stored; and producing the pure water from the water stored in the tank. The produced pure water may be supplied to the paint tank via the pure water supply passage.

A second aspect of the invention relates to an electrostatic painting apparatus that includes a paint tank within which paint is stored; a painting machine that has a voltage applying portion that applies a high voltage to paint that is pushed out from the paint tank by pure water that is supplied, and a spraying portion that sprays the paint to which the high voltage has been applied by the voltage applying portion at an object to be painted; a pure water supplying portion that supplies the pure water to the paint tank via a pure water supply passage; and a replacing portion that replaces pure water remaining in the pure water supply passage to increase an electrical resistance value of the pure water, before starting to paint the object to be painted.

In the electrostatic painting apparatus, the pure water supplying portion may have a first pure water tank, and also have a second pure water tank that supplies pure water to the first pure water tank.

The invention makes it possible to provide an electrostatic painting method and an electrostatic painting apparatus that enable painting to be performed normally by inhibiting a high voltage abnormality when painting starts.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Example Embodiment

Figure 1:
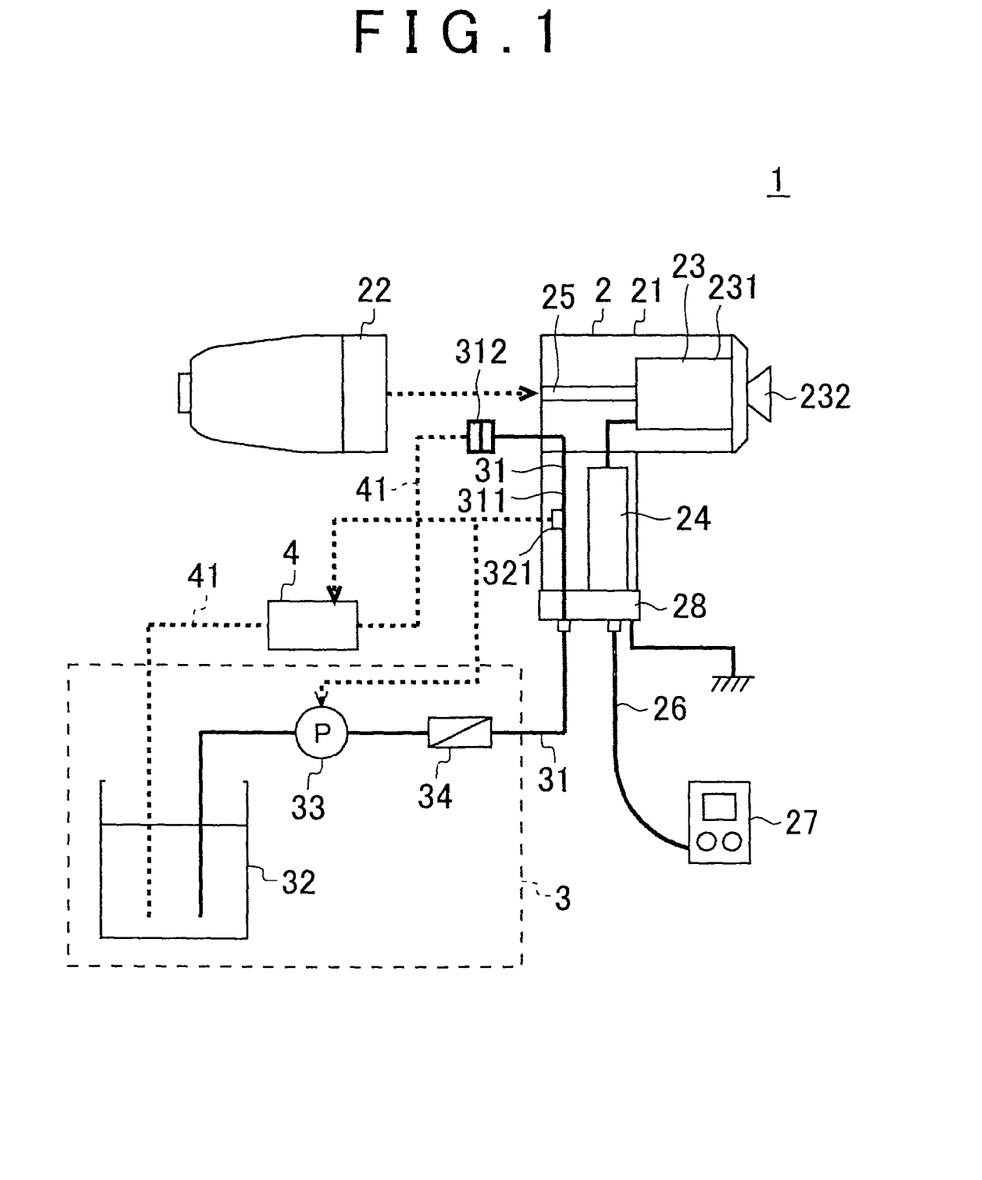
FIG. 1 is a block diagram of the general system structure of an electrostatic painting apparatus according to a first example embodiment of the invention.

Hereinafter, example embodiments of the invention will be described with reference to the drawings. FIG. 1 is a block diagram of the general system structure of an electrostatic painting apparatus according to a first example embodiment of the invention. The electrostatic painting apparatus 1 according to the first example embodiment includes a painting machine 2 that paints an object to be painted, a pure water supply device 3 that supplies pure water to the painting machine 2, and a circulator 4 that circulates the pure water of the painting machine 2.

The painting machine 2 is mounted to an arm of a paint robot, for example. The paint robot is able to paint an object to be painted, such as a vehicle, by pointing the painting machine 2 at the object to be painted and spraying paint. The painting machine 2 has a painting machine main body 21, a paint tank 22 that is detachably attached to the painting machine main body 21, a sprayer 23 that is built into the painting machine main body 121 and sprays paint at the object to be painted, and a cascade 24 that is built into the painting machine main body 21 and applies high voltage to the paint.

Figure 2:
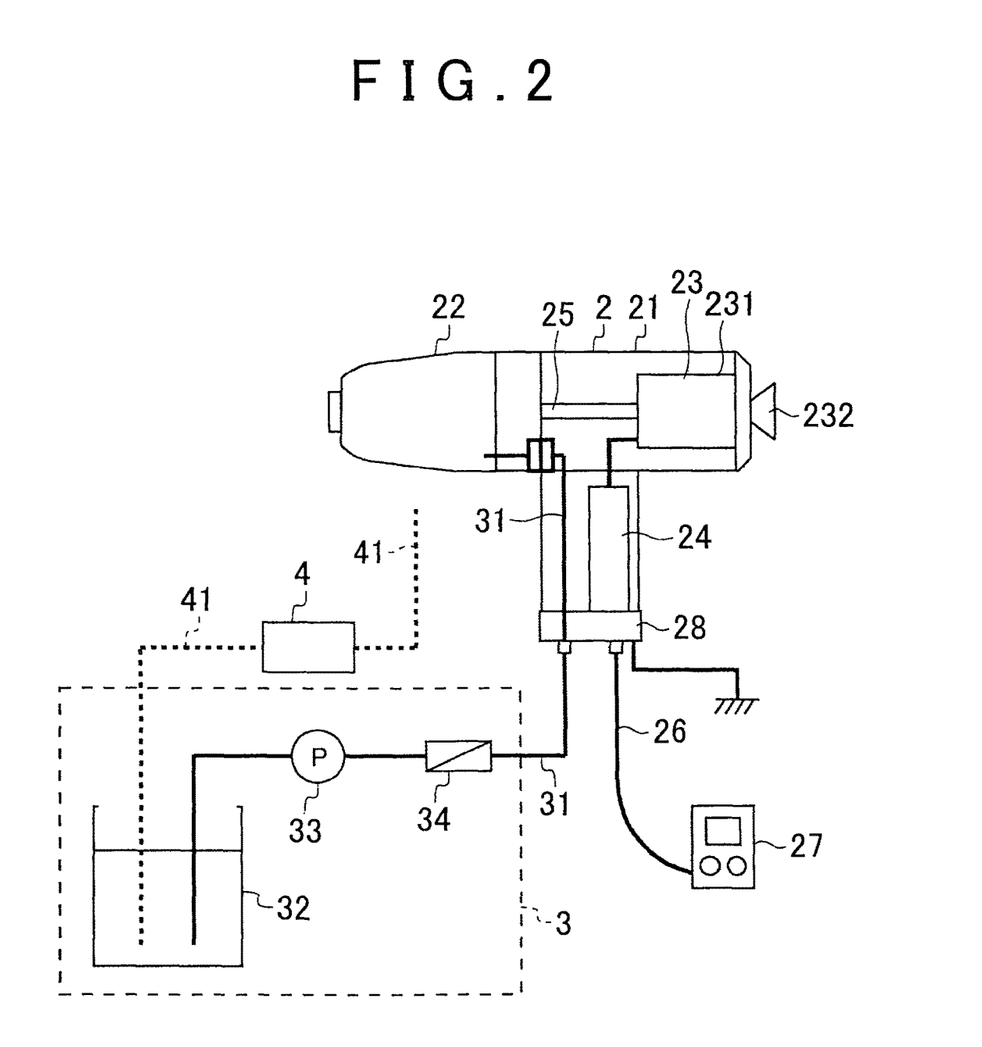
FIG. 2 is a view of a painting machine from which a circulator has been detached and to which a paint tank has been attached.

The paint tank 22 is a tank within which organic solvent-based paint or water-based paint, for example, is stored. When attached to the painting machine main body 21, the paint tank 22 is connected to the sprayer 23 via a conductive bar 25 (FIG. 2). Therefore, the paint tank 22 and the sprayer 23 both become a high voltage with the same potential. The paint in the paint tank 22 is pushed out toward the sprayer 23 side by pure water supplied from the pure water supply device 3. The inside of the paint tank 22 is divided into a paint chamber within which the paint is stored, and a pure water chamber to Which the pure water is supplied. When pure water is supplied to the pure water chamber from the pure water supply device 3, a piston that divides the paint chamber from the pure water chamber is pushed toward the paint chamber side. Paint is pushed out from the paint chamber toward the sprayer 23 side by this movement of the piston. The method by which the paint in the paint tank 22 is pushed out is only an example. The method is not limited to this. Any suitable method may be applied. For example, a bag with paint in it may be arranged in the paint tank 22, and pure water may be injected into the paint tank around the outside of the bag. Injecting the pure water increases the external pressure on the bag, thereby pushing out paint from within the bag in the paint tank.

The cascade 24 is one specific example of a voltage applying portion, and applies a high voltage to the paint in the sprayer 23. A HV controller 27 is connected to the cascade 24 via a LV cable 26. The HV controller 27 controls the voltage of the cascade 24. A user is able to adjust the voltage of the cascade 24 by operating the HV controller 27.

The sprayer 23 is one specific example of a spraying portion, and sprays paint that has been pushed out of the paint tank 22 and to which a high voltage has been applied by the cascade 24, at the object to be painted. The sprayer 23 includes an air motor 231, and a bell head (atomizing head) 232, for example. The bell head 232 is connected to a drive shaft of the air motor 231, and the air motor 231 rotates the bell head 232 at a high speed. The cascade 24 is connected to the air motor 231, and a high voltage is applied to the air motor 231. As a result, the bell head 232 that rotates at a high speed sprays charged paint particles that have been charged with the high voltage at the object to be painted.

The pure water supply device 3 is one specific example of a pure water supplying portion, and supplies pure water to the paint tank 22 via a pipe (i.e., a pure water supply passage) 31. The pure water supply device 3 includes a tank 32 within which water such as tap water, industrial water, pure water, or ultrapure water is stored, a pump 33 that pumps the water from the tank 32, and a pure water generator 34 that produces the pure water from the water delivered from the pump 33. The pure water generator 34 produces pure water with a high degree of purity using, for example, a microfiltration membrane method, a reverse osmosis membrane method, an ion exchange method, an electro-deionization method, or a distillation method or the like. The pure water produced by the pure water generator 34 is supplied to the paint tank 22 through the pipe 31 in the painting machine 2.

While the electrostatic painting apparatus is stopped, pure water may remain in the pipe between the pure water supply device and the paint tank, and the electrical resistance value of this pure water may decrease. This is because there is a strong tendency for pure water to react with many substances, and volatile organic substances, dioxide ions, carbon dioxide in the air and the like dissolve in the pure water, thus lowering the electrical resistance value. If painting starts and a high voltage is applied in this state, the current value flowing through the pure water-remaining in the pipe will become large and a high voltage abnormality may result, such that painting may not be able to be performed normally.

In contrast, with the electrostatic painting apparatus 1 according to the first example embodiment, the pure water remaining in the pipe 31 between the pure water supply device 3 and the paint tank 22 is replaced to increase the electrical resistance value of the pure water, before the object to be painted starts to be painted. As a result, the electrical resistance value of the pure water in the pipe 31 between the pure water supply device 3 and the paint tank 22 is able to be kept at a high value, so the high voltage abnormality at the start of painting described above is able to be inhibited, thus enabling painting to be performed normally.

In the first example embodiment, for example, a mounting portion 28 of the painting machine 2 is a ground region, and the paint tank 22 that is connected to the cascade 24 via the conductive bar 25 and the air motor 231 is a high voltage region. Therefore, current may flow through the pure water remaining in a pipe 311 that is between the mounting portion 28 of the painting machine 2 and the paint tank 22, and this current may leak to the ground region. This leakage current value is determined by the electrical resistance value of the pure water in the pipe 311. In this first example embodiment, in particular, replacing the pure water in the pipe 311 that is positioned between the mounting portion 28 that is the ground region and the paint tank 22 that is the high voltage region enables the electrical resistance value of this pure water to be kept at a high value. As a result, the leakage current value is able to be kept low, so the high voltage abnormality described above is able to be inhibited.

The circulator 4 circulates the pure water supplied to the paint tank 22 to the tank 32 of the pure water supply device 3 (see FIG. 1). Before painting starts, the paint tank 22 is removed from the painting machine 2. One end 312 of the pure water supply passage 31 that supplies pure water to the paint tank 22 is connected to the circulator 4. The circulator 4 returns pure water in the pure water supply passage 31 to the tank 32 of the pure water supply device 3 via a pipe 41. At the same time, the pure water supply device 3 supplies pure water to the pure water supply passage 31. As a result, the pure water in the pure water supply passage 31 is replaced before painting starts. A conductivity meter 321 that detects the electrical resistance value of the pure water in the pure water supply passage 31, for example, is provided in the pure water supply passage 31. The circulator 4 circulates the pure water in the pure water supply passage 31 described above, until the electrical resistance value of the pure water in the pure water supply passage 31 detected by the conductivity meter 321 becomes a predetermined value.

An ammeter that detects the leakage current value leaking from the pure water in the pure water supply passage 31 between the mounting portion 28 and the paint tank 22 may also be provided in the pure water supply passage 31. In this case, the circulator 4 circulates the pure water in the pure water supply passage 31 as described above until the leakage current value detected by the ammeter becomes a predetermined value.

Next, an electrostatic painting method according to the first example embodiment will be described in detail. First, the paint tank 22 is removed from the painting machine 2. The circulator 4 is connected to the one end 312 of the pure water supply passage 31 of the painting machine 2. The circulator 4 and the pure water supply device 3 are operated to circulate the pure water in the pure water supply passage 31 to the tank 32. At this time, the cascade 24 applies a high voltage to the air motor 231. The circulator 4 and the pure water supply device 3 stop when the electrical resistance value of the pure water in the pure water supply passage 31 detected by the conductivity meter 321 becomes a predetermined value. With this, replacement of the pure water in the pure water supply passage 31 is complete.

The pipe 41 of the circulator 4 is detached from the painting machine 2. The paint tank 22 is attached to the painting machine 2 (FIG. 2). The pure water supply device 3 is operated and pure water is supplied to the paint tank 22 via the pure water supply passage 31. As a result, paint is pushed out from the paint tank 22 to the air motor 231. At the same time, the cascade 24 applies a high voltage to the air motor 231. The air motor 231 rotates the bell head 232 at a high speed, and the bell head 232 sprays high-voltage charged paint and starts painting.

In this first example embodiment, the pure water remaining in the pipe 31 between the pure water supply device 3 and the paint tank 22 is replaced before starting to paint the object to be painted. As a result, the electrical resistance value of the pure water in the pipe 31 between the pure water supply device 3 and the paint tank 22 is able to be kept at a high value, so a high voltage abnormality when painting starts is able to be inhibited, thereby enabling painting to be performed normally.

Figure 3:
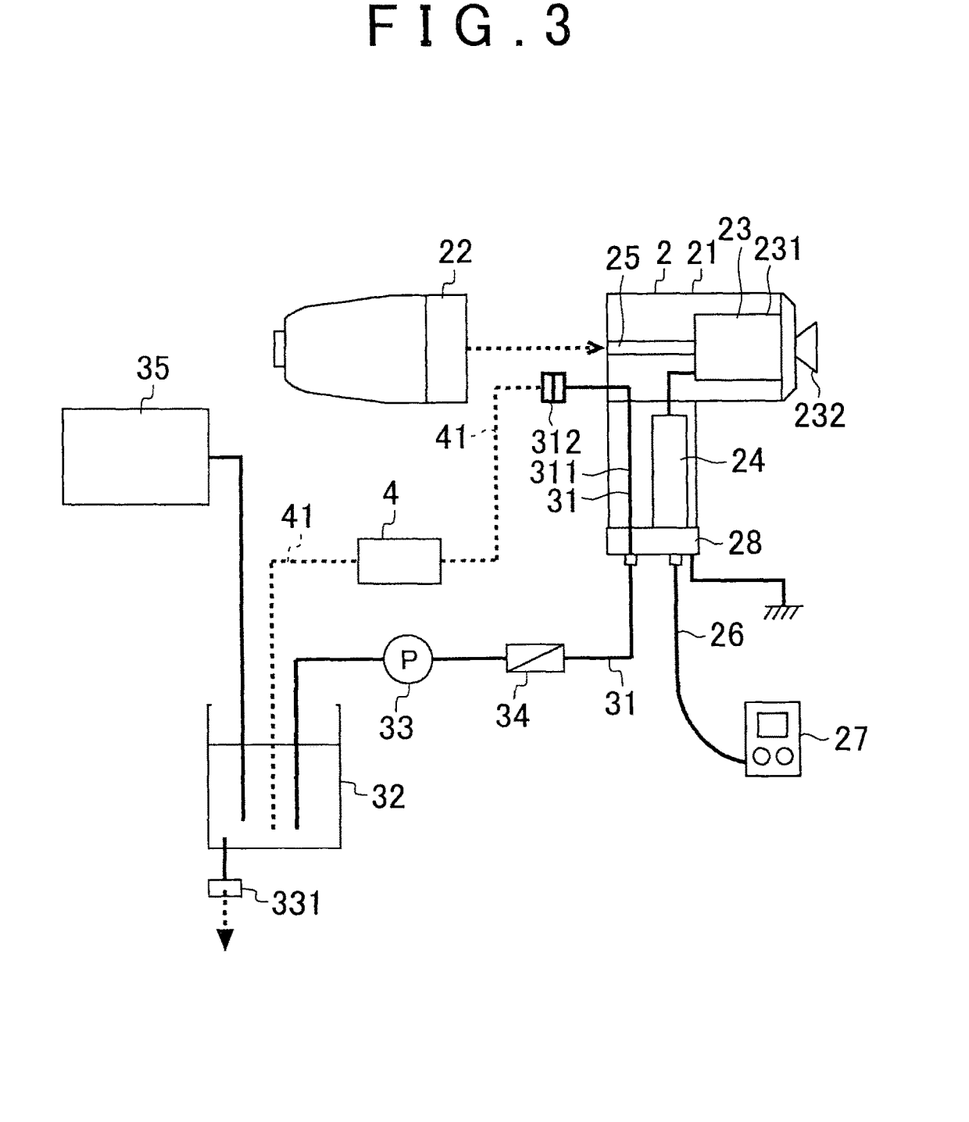
FIG. 3 is a view of a structure further including a pure water tank in the first example embodiment of the invention.

In the first example embodiment described above, the pure water supply device 3 may also include a pure water tank 35 within which pure water is stored (FIG. 3). The pure water tank 35 supplies pure water to the tank 32. A discharge valve 331 that discharges the pure water in the tank 32 is provided in the tank 32. For example, when pure water remains in the tank 32 for an extended period of time, the pure water tank 35 supplies fresh pure water to the tank 32 and the discharge valve 331 discharges the old pure water in the tank 32, thereby enabling the electrical resistance value of the pure water in the tank 32 to be kept at a high value.

Figure 4:
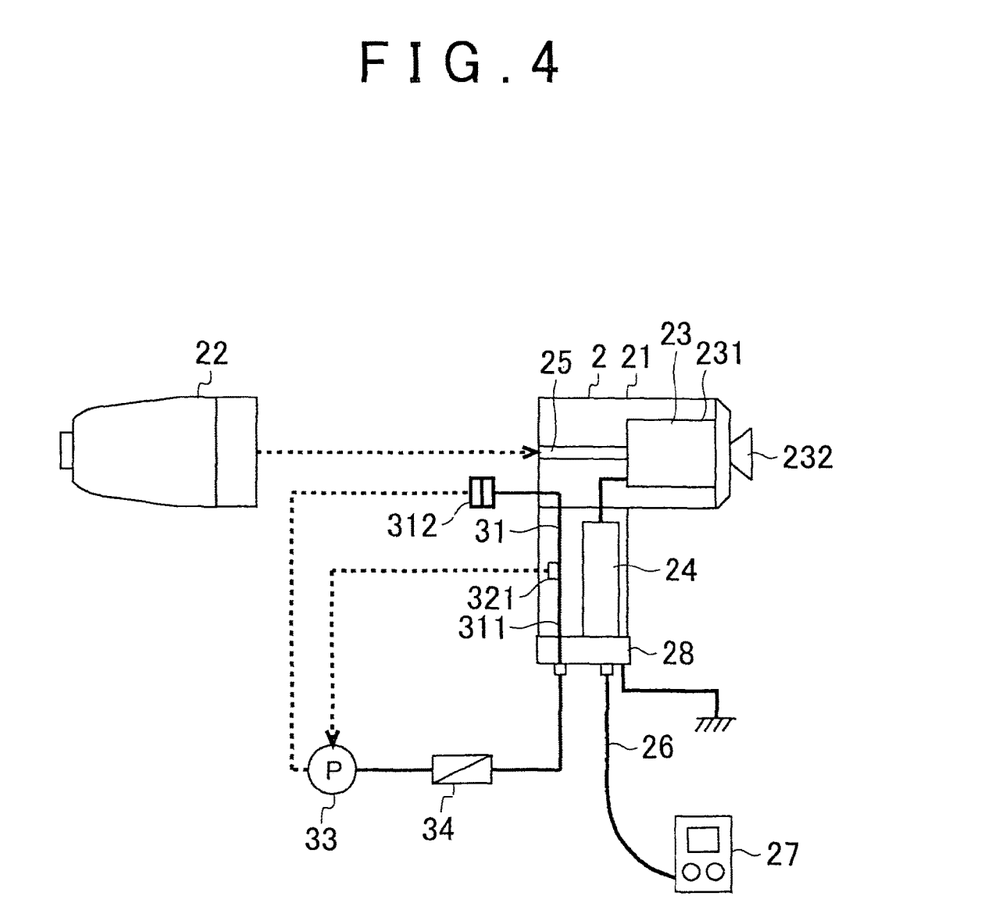
FIG. 4 is a view of a structure that circulates pure water between a pump, a pure water generator, and the painting machine.

Further, pure water is supplied from the tank 32 to the pure water generator 34, and from this pure water the pure water generator 34 is able to produce pure water with an even higher electrical resistance value and supply it to the painting machine 2. In the first example embodiment described above, the configuration may also be such that pure water is circulated between the pump 33, the pure water generator 34, and the painting machine 2, without passing through the circulator 4 and the tank 32 (FIG. 4). The pump 33 and the pure water generator 34 of the pure water supply device 3 are operated to circulate the pure water in the pure water supply passage 31 to the tank 32. At this time, the cascade 24 applies a high voltage to the air motor 231. The pure water supply device 3 stops when the electrical resistance value of the pure water in the pure water supply passage 31 detected by the conductivity meter 321 becomes a predetermined value. In this case, the structure of the electrostatic painting apparatus 1 is able to be further simplified, which leads to a reduction in costs.

Second Example Embodiment

In the first example embodiment described above, pure water in the pure water supply passage 31 is replaced by circulating it to the tank 32 of the pure water supply device 3 using the circulator 4. On the other hand, in a second example embodiment of the invention, pure water in the pure water supply passage 31 is replaced by discharging it (i.e., the pure water in the pure water supply passage 31) out of the painting machine 2.

Figure 5:
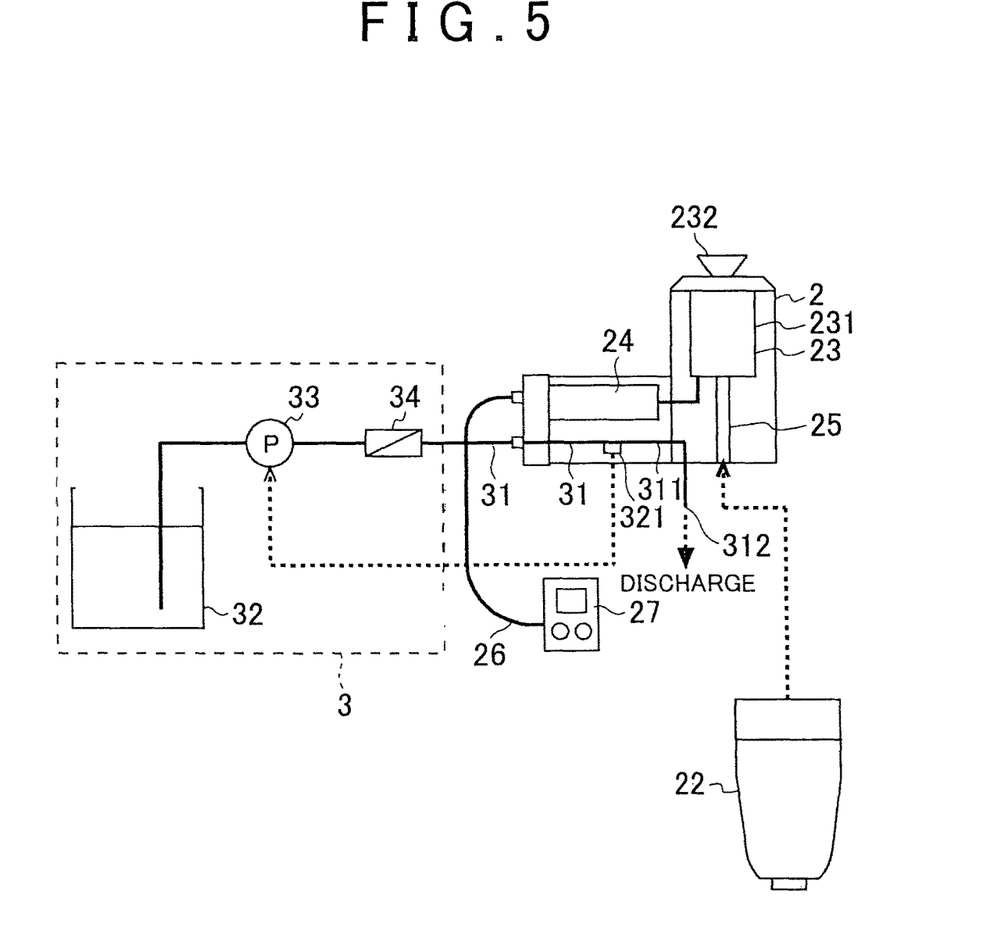
FIG. 5 is a block diagram of the general structure of an electrostatic painting apparatus according to a second example embodiment of the invention.

FIG. 5 is a block diagram of the general structure of an electrostatic painting apparatus according to the second example embodiment. As shown in FIG. 5, the paint tank 22 is removed from the painting machine 2 before painting starts. The pure water supply device 3 supplies pure water to the painting machine 2. Here, the one end 312 of the pure water supply passage 31 in the painting machine 2 is free. Therefore, the pure water in the pure water supply passage 31 is discharged outside from this one end 312.

In this way, pure water remaining in the pure water supply passage 31 is discharged outside, and the pure water in the pure water supply passage 31 is replaced with fresh pure water. The pure water supply device 3 stops when the electrical resistance value of the pure water in the pure water supply passage 31 detected by the conductivity meter 321 becomes a predetermined value. With this, replacement of the pure water in the pure water supply passage 31 is complete.

The paint tank 22 is attached to the painting machine 2. The pure water supply device 3 is operated and pure water is supplied to the paint tank 22 via the pure water supply passage 31. As a result, paint is pushed out from the paint tank 22 to the air motor 231 side. At the same time, the cascade 24 applies a high voltage to the air motor 231. The air motor 231 rotates the bell head 232 at a high speed, and the bell head 232 sprays the high-voltage charged paint. In this second example embodiment, the other structure is substantially the same as it is in the first example embodiment described above, so like portions are denoted by like reference characters, and detailed descriptions of those portions are omitted.

Figure 6:
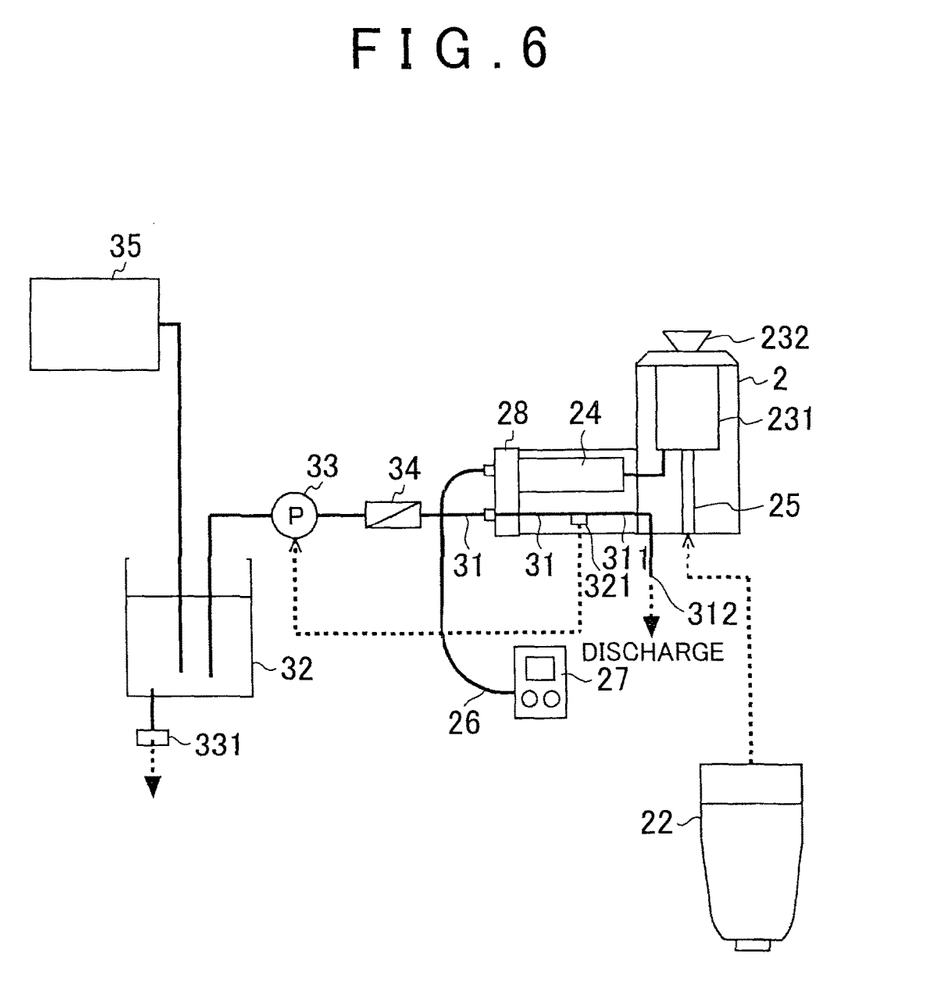
FIG. 6 is a view of a structure further including a pure water tank in the second example embodiment of the invention.

In the second example embodiment described above, the pure water supply device 3 may also include the pure water tank 35 within which pure water is stored (FIG. 6). The pure water tank 35 supplies the pure water to the tank 32. The discharge valve 331 discharges the pure water in the tank 32 outside.

The invention is not limited to the example embodiments described above, and can be modified as appropriate within the scope thereof. In the example embodiments described above, pure water in the pure water supply passage 31 is circulated and discharged after the paint tank 22 is removed, but the example embodiments are not limited to this. That is, pure water in the pure water supply passage 31 may also be circulated and discharged while the paint tank 22 is attached. For example, when a switching valve or the like is provided in the painting machine 2 and the pure water in the pure water supply passage 31 is circulated and discharged, the pure water in the pure water supply passage 31 may also be circulated and discharged by switching this switching valve.

The invention claimed is:

1. An electrostatic painting method comprising:
supplying, via a water supply passage, water to a paint tank within which paint is stored;
applying a voltage to paint that is pushed out from the paint tank by the supplied water; and
spraying the paint to which the voltage has been applied, at an object to be painted, wherein
before starting to paint the object to be painted, water remaining in the water supply passage is replaced such that the water in the water supply passage has an increased electrical resistance value compared to the water in the water supply passage prior to the replacement,
the water remaining in the water supply passage is circulated to a water supply device that supplies the water, or the water remaining in the water supply passage is discharged outside, before starting to paint the object to be painted,
the electrostatic painting method further comprises detecting the electrical resistance value of the water in the water supply passage, and
when the detected electrical resistance value of the water in the water supply passage becomes a predetermined value, circulation of the water remaining in the water supply passage to the water supply device, or discharge of the water remaining in the water supply passage, is stopped.

2. The electrostatic painting method according to claim 1, wherein
the paint tank is detachably provided on a painting machine that paints the object to be painted; and
water remaining in the water supply passage positioned between a mounting portion of the painting machine, which is a ground region, and the paint tank that is a high voltage region, is replaced before starting to paint the object to be painted.

3. The electrostatic painting method according to claim 1, further comprising:
injecting water into a tank within which water is stored; and
producing the water from the water stored in the tank, wherein
the produced water is supplied to the paint tank via the water supply passage.

4. The electrostatic painting method according to claim 1, wherein
the water remaining in the water supply passage is circulated to a water supply device that supplies the water, before starting to paint the object to be painted.

5. The electrostatic painting method according to claim 1, wherein
the water remaining in the water supply passage is discharged outside before starting to paint the object to be painted.

6. An electrostatic painting method comprising:
supplying, via a water supply passage, water to a paint tank within which paint is stored;
applying a voltage to paint that is pushed out from the paint tank by the supplied water; and
spraying the paint to which the voltage has been applied, at an object to be painted, wherein
before starting to paint the object to be painted, water remaining in the water supply passage is replaced such that the water in the water supply passage has an increased electrical resistance value compared to the water in the water supply passage prior to the replacement,
the water remaining in the water supply passage is circulated to a water supply device that supplies the water, or the water remaining in the water supply passage is discharged outside, before starting to paint the object to be painted,
the electrostatic painting method further comprises detecting a leakage current value that leaks from the water in the water supply passage, and
when the detected leakage current value of the water in the water supply passage becomes a predetermined value, circulation of the water remaining in the water supply passage to the water supply device, or discharge of the water remaining in the water supply passage, is stopped.

7. The electrostatic painting method according to claim 6, wherein
the paint tank is detachably provided on a painting machine that paints the object to be painted; and
water remaining in the water supply passage positioned between a mounting portion of the painting machine, which is a ground region, and the paint tank that is a high voltage region, is replaced before starting to paint the object to be painted.

8. The electrostatic painting method according to claim 6, further comprising:
injecting water into a tank within which water is stored; and
producing the water from the water stored in the tank, wherein
the produced water is supplied to the paint tank via the water supply passage.

9. The electrostatic painting method according to claim 6, wherein
the water remaining in the water supply passage is circulated to a water supply device that supplies the water, before starting to paint the object to be painted.

10. The electrostatic painting method according to claim 6, wherein
the water remaining in the water supply passage is discharged outside before starting to paint the object to be painted.

* * * * *